No. 788,332. PATENTED APR. 25, 1905.
E. F. A. VON SCHRÖTTER.
MEANS FOR SHUTTING OR CLOSING HATCHWAYS.
APPLICATION FILED SEPT. 12, 1904.
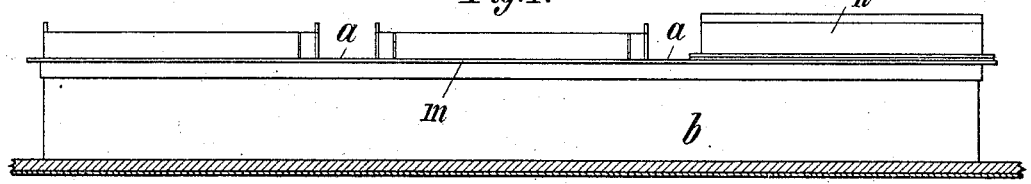
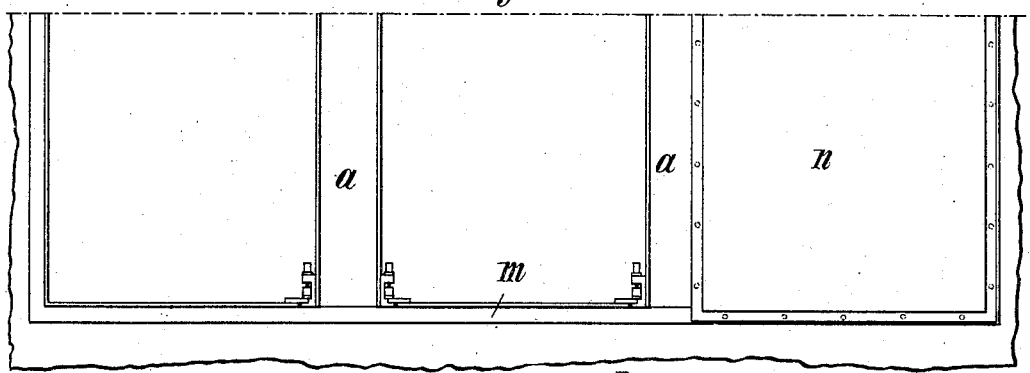
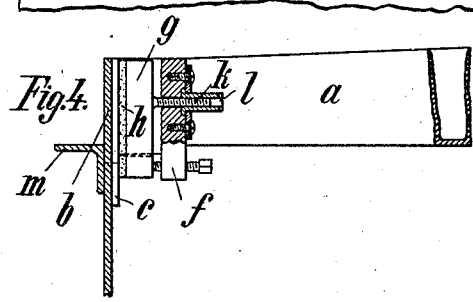
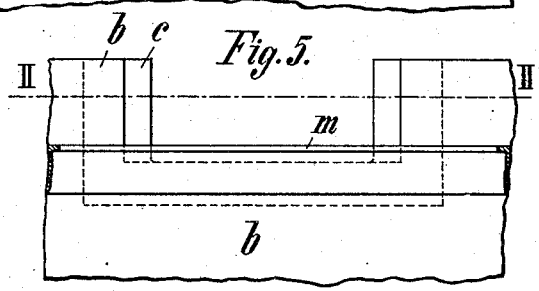
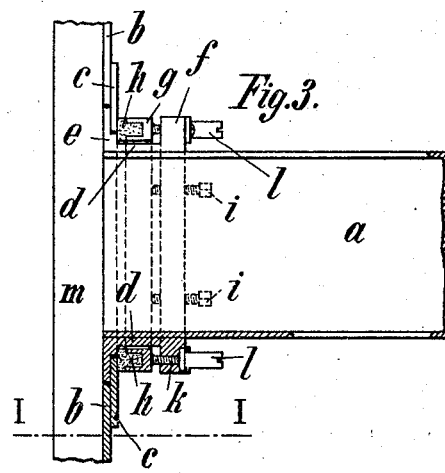
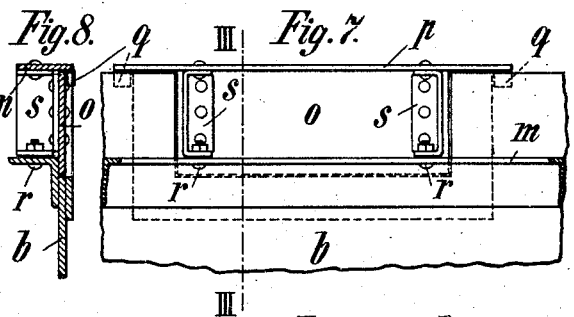

No. 788,332. Patented April 25, 1905.

UNITED STATES PATENT OFFICE.

ERNST FRIEDRICH ADALBERT VON SCHRÖTTER, OF HAMBURG, GERMANY.

MEANS FOR SHUTTING OR CLOSING HATCHWAYS.

SPECIFICATION forming part of Letters Patent No. 788,332, dated April 25, 1905.

Application filed September 12, 1904. Serial No. 224,091.

*To all whom it may concern:*

Be it known that I, ERNST FRIEDRICH ADALBERT VON SCHRÖTTER, a subject of the German Emperor, and a resident of Hamburg, in the German Empire, have invented certain new and useful Improvements in and Relating to Means for Shutting or Closing Hatchways, of which the following is a specification.

This invention has for its object means for shutting or closing hatchways whereby the defects of the contrivances hitherto generally employed, such as wooden hatch-covers laid over the hatchways and battened down, may be obviated.

In order to attain the desired results in accordance with this invention, an iron hatch shutting or closing device with rigid hoods is constructed which presents the following advantages: speedy and reliable opening and closing for the purpose of effecting loading and unloading and the like, resulting in considerable economy of time; absolutely secure closing against rain, spray, or swilling water; equal strength with the deck, and consequently increased security against leakage due to seas breaking over the vessel, and, finally, the almost complete absence of charges for maintenance.

Now in order that the entire length of the hatchway may be utilized while at the same time to permit of using a shutting of the hatchway by rigid hoods the U-shaped hood-supports which divide the hatchway into smaller openings are arranged in such a manner that at or with their ends they make a water-tight joint with the hatch-coamings and are yet capable of being readily and speedily removed and replaced.

A constructional form of the invention is illustrated in the accompanying drawings, in which—

Figure 1 shows a hatch in side elevation. Fig. 2 is a plan view of the same. Fig. 3 represents in plan view one end of a hood-support placed in position, partly in section and to a larger scale. Fig. 4 is a section on the line I I, Fig. 3. Fig. 5 is a side elevation of a hatch-coaming with the hood-support removed, likewise to a larger scale. Fig. 6 is a section on the line II II, Fig. 5. Fig. 7 is a similar view to Fig. 5, except that the opening in the hatch-coaming is closed by a fitted part or filling-plate; and Fig. 8 is a section on the line III III, Fig. 7.

For the insertion of the U-shaped hood-supports $a$ the hatch-coamings $b$ are suitably recessed, the edges of these recesses being strengthened by U-shaped guide and stiffening plates $c$, riveted and calked upon the inner face of the hatch-coaming. These plates $c$ project somewhat over the vertical sides of the hatch-coaming recess. Each hood-support is surrounded at its extremities by a fitting $d$, presenting an outer and an inner end flange $e$ and $f$, respectively. The outer flange $e$ is cut away at the vertical sides in such a manner that it may be inserted in the hatch-coaming recess and behind the plate $c$. When the hood-support is arranged in position, it rests with the under side of the flange $e$ upon the horizontal edges of the hatch-coaming recess, and the stiffening-plate $c$, the end face of the said flange, and that of the hood-support fit flush against the side or outer wall of the hatch-coaming. In the same way the upper edges of the flange, of the hood-support, and of the plate $c$ terminate at the same height as the upper edge of the hatch-coaming, as clearly shown in Figs. 3 and 4. In the interval between the flanges $e$ and $f$ a U-shaped packing-ledge $g$ is inserted, and for the purpose of packing the joint between the flange $e$ and the plate $c$ it is covered with appropriate packing material $h$. The displacing of the packing-ledge forward against and back from the joint to be packed may be effected by means of set-screws mounted in the flange $f$. In the constructional example shown the lower screws are ordinary set-screws $i$, while the lateral screws are at the same time formed as transport-screws. To this end the screw-spindles $k$ are fixed to the packing-ledge $g$, while the sleeves or nuts $l$ are mounted in such a manner as to be rotatable but not displaceable in the flange $f$, Figs. 3 and 4. The arrangement is such that when it is desired to loosen the ledge $g$ from the joint which it serves to pack the screws $i$ are first of all slackened and then by suitably rotating the nuts $l$ the spindles $k$, and with them the ledge $g$, are drawn back. The ledge $g$ is tightened by effecting the same operations in the reverse order, the nuts $l$ being first operated and then the screws $i$. When the packing-screws $i$ are tightened, not only a water-tight joint is obtained between the flanges $e$ and the plates $c$ and the ledges $g$, but also such a friction is produced between the guide-plate $c$ of the hatch-coamings and the packing-ledges $g$ of the hood-support that the hood-support cannot be torn out of its bearings by cargo striking from beneath against the said hood-support. When the packing or set screws are released, the joint is unmade and the hood-support may be removed. By this means the problem is solved in principle, because the hood-supports may be caused to form a water-tight joint with the hatch-coamings by tightening the packing-screws, while on the other hand they may be removed in a few seconds after the packing-screws have been loosened.

The water-tight closing of the rigid hoods over the hatch-divisions formed by the hood-supports is attained in the following manner: Upon the angle-iron $m$, which runs round the outside of the hatch coamings or borders without cramping the hood-supports during insertion or removal, a crown of packing material—such as india-rubber or sennit, for example—is laid, the hoods $n$ being then placed thereon in the manner shown in Figs. 1 and 2. By means of screw-bolts which pass through openings in the hood-flange and in the angle-iron $m$, and in some cases also in the bottom of the hood-support, the rigid hoods are pressed water-tight upon the crown of packing or the angle-iron $m$ and the bottom of the hood-support. The outer joints between the flanges $e$, the hatch-coamings $b$, and the angle-iron $m$ may be calked beforehand, if desired, by means of cement or quick-drying thick paint, so that water or the like may not unnecessarily enter these joints.

In order to clear the hatches for loading or unloading, the screw-bolts which hold the rigid hoods firmly upon the angle-iron and the hood-supports are slackened and removed, after which the hoods are lifted off by the deck-cranes or the like, thus uncovering the hatchway-divisions through which loading or unloading is to be effected, these preliminary operations occupying but a few moments. When large articles in the cargo require the entire length of the hatchway, the packing-screws $i$ $l$ $k$ are loosened until the packing-ledges $g$ are drawn completely back against the flanges $f$, and by means of the crane the hood-supports are lifted out, whereupon the hatchway is uncovered and capable of being used throughout its entire length.

In order that during loading and unloading the edges and packing-faces of the recesses in the hatch-coamings may be prevented or preserved from being injured or damaged by cargo striking against them, a suitable filling member $o$, Figs. 7 and 8, may be inserted in each recess, the said filling member or plate $o$ being provided at its upper part with a rail $p$, covering the upper edges of the plate $c$ and the hatch-coaming. The rail $p$ engages by means of small hook-like projections $q$ over the hatch-coaming. In order to secure the filling member in place, it may be screwed in position by means of screw-bolts $r$, which are passed through openings in the flange $m$ and in the angle-iron $s$, riveted to the member $o$.

In preparing the hatches for sea the hood-supports are placed in their grooves or recesses in the hatch-coamings, the packing-screws of the packing-ledges tightened, and in the case of a long voyage cement is applied to the joints from the outside in order to prevent any unnecessary admission of water and the consequent rusting of the joints together or to the packing material, the hoods are placed in position, the screw-bolts inserted through the holes in the hood-flange and in the hatch-coaming flange or in the hood-supports, and the hoods firmly screwed to their supports by means of nuts, whereby the intermediate packing-crown is compressed and a tight joint obtained. The hatches are then ready for sea. For short trips, such as coasting voyages and while in harbor, it is not necessary to apply cement or quick-drying thick paint to the outer joints.

Having fully described my invention, what I claim, and desire to secure by Letters Patent, is—

1. In a hatchway, the combination with a metallic coaming, of removable channel-shaped hood-supports and means on the ends of said supports to secure them to and flush with the outer face of the coaming, substantially as and for the purpose set forth.

2. In a hatchway having coamings, the combination with a suitable number of hoods; of hood-supports U-shaped in section to divide the hatchway into as many portions as there are hoods to cover the hatchway, means to removably secure the supports at their ends in the hatchway-coamings, and means to make the joint between the supports and hatchway water-tight and to frictionally secure the ends of said supports in place in the coamings.

3. In a hatchway, the combination with a metallic coaming having cut-away portions and U-shaped plates, overlapping the sides of the cut-away portions, of a removable hood-support, an engaging member or plate on each end of the support seated and closing said cut-away portions flush with the outer face of the coaming, and a sealing member to effect a water-tight joint between the plates and securing members, substantially as and for the purpose set forth.

4. In a hatchway, the combination with a metallic coaming having cut-away portions and U-shaped plates overlapping the sides of said cut-away portions, of removable channel-shaped hood-supports, a securing-plate on each end of the supports to fit the cut-away portions flush with the outer face of the coaming, and adjustable sealing members secured to the supports and movable to and from the joint between the securing-plates and U-shaped plates, substantially as and for the purpose set forth.

5. In a hatchway, the combination with a metallic coaming having cut-away portions, of removable channel-shaped hood-supports whose ends are supported in and flush with the outer face of said coaming in the cut-away portions, and filling members adapted to fill the cut-away portions when the supports are removed, substantially as described.

ERNST FRIEDRICH
ADALBERT VON SCHRÖTTER.

Witnesses:
MAX KAEMPFF,
E. H. L. MUMMENHOFF.